(12) United States Patent
Hillis

(10) Patent No.: US 6,612,041 B1
(45) Date of Patent: Sep. 2, 2003

(54) DIURNAL SOLAR EVENT TRIGGERING MECHANISM

(75) Inventor: W. Daniel Hillis, Toluca Lake (CA)

(73) Assignee: The Long Now Foundation, Sausalito, CA (US)

(*) Notice: Subject to any disclaimer, the term of this patent is extended or adjusted under 35 U.S.C. 154(b) by 179 days.

(21) Appl. No.: 09/636,001

(22) Filed: Aug. 9, 2000

Related U.S. Application Data

(60) Provisional application No. 60/147,980, filed on Aug. 9, 1999.

(51) Int. Cl.[7] .............................................. G04B 49/00
(52) U.S. Cl. ......................... 33/269; 33/270; 968/414; 968/DIG. 1
(58) Field of Search ........................ 33/268, 269, 270, 33/271; 968/414, 415, 416; 374/120, 121, 145, 205; 126/581, 600, 602, 605

(56) References Cited

U.S. PATENT DOCUMENTS

| | | | | |
|---|---|---|---|---|
| 2,403,834 A | * | 6/1936 | Marbury | 236/91 R |
| 2,407,036 A | * | 9/1946 | Snavely | 165/237 |
| 2,968,916 A | * | 1/1961 | Taylor et al. | 60/641.8 |
| 3,982,526 A | * | 9/1976 | Barak | 126/580 |
| 4,026,269 A | * | 5/1977 | Stelzer | 126/702 |
| 4,031,385 A | | 6/1977 | Zerlaut et al. | 250/203.4 |
| 4,088,120 A | * | 5/1978 | Anderson | 126/573 |
| 4,089,323 A | * | 5/1978 | Trihey | 126/581 |
| 4,091,796 A | * | 5/1978 | Bieringer et al. | 126/657 |
| 4,173,213 A | * | 11/1979 | Kelly | 126/604 |
| 4,178,913 A | * | 12/1979 | Hutchison | 126/601 |
| 4,188,571 A | * | 2/1980 | Brunson | 322/2 R |
| 4,226,502 A | * | 10/1980 | Gunzler | 126/574 |
| 4,235,222 A | * | 11/1980 | Ionescu | 126/579 |
| 4,283,588 A | * | 8/1981 | Zitzelsberger | 136/246 |
| 4,306,540 A | * | 12/1981 | Hutchison | 126/607 |
| 4,332,239 A | | 6/1982 | Hotine | 126/576 |
| 4,365,616 A | * | 12/1982 | Vandenberg | 126/581 |
| 4,404,465 A | * | 9/1983 | Miller | 250/203.4 |
| 4,414,812 A | * | 11/1983 | Parry | 60/641.14 |
| 4,421,104 A | * | 12/1983 | Adcock | 126/600 |
| 4,432,343 A | * | 2/1984 | Riise et al. | 126/602 |
| 4,440,155 A | | 4/1984 | Maloof et al. | 126/570 |
| 4,498,456 A | * | 2/1985 | Hashizume | 126/581 |
| 4,508,493 A | * | 4/1985 | O'Hare | 417/379 |
| 4,821,705 A | * | 4/1989 | Trihey | 126/574 |
| 4,977,744 A | * | 12/1990 | Lenz | 60/641.15 |
| 5,148,012 A | | 9/1992 | Carter | 250/203.4 |
| 5,326,171 A | * | 7/1994 | Thompson et al. | 374/121 |
| 5,413,161 A | | 5/1995 | Corazzini | 160/7 |
| 5,899,071 A | * | 5/1999 | Stone et al. | 60/641.8 |

FOREIGN PATENT DOCUMENTS

| | | |
|---|---|---|
| DE | 295 19 857 | 12/1995 |
| DE | 197 54 465 | 12/1997 |
| GB | 2 113 822 | 8/1983 |
| GB | 2 292 876 | 3/1996 |
| JP | 9-269386 | 10/1997 |
| JP | 11-174166 | 7/1999 |
| WO | WO 97/49956 | 12/1997 |

* cited by examiner

Primary Examiner—Diego Gutierrez
Assistant Examiner—R. Alexander Smith
(74) Attorney, Agent, or Firm—Glenn Patent Group; Michael A. Glenn

(57) ABSTRACT

A mechanism for determining whether the sun is visible at a diurnal solar event and for mechanically triggering actions based upon the sun being visible during the diurnal solar event is disclosed. The mechanisms of the invention can perform these operations without intervention or supervision for long periods of time. Certain embodiments have been applied to provide a diurnal solar event trigger based upon sidereal noon for a clock providing accurate timing for 10,000 years without intervention or supervision.

30 Claims, 4 Drawing Sheets

DIURNAL SOLAR EVENT TRIGGERING MECHANISM

CROSS-REFERENCE TO RELATED APPLICATIONS

This application claims priority to U.S. Provisional Patent Application No. 60/147,980 filed Aug. 9, 1999.

TECHNICAL FIELD

This invention relates to solar synchronization of clocks and solar event triggering mechanisms.

BACKGROUND ART

There are numerous ancient examples of solar event triggering mechanisms. The most famous example is Stonehenge. This and other similar structures provided a specific site where specific sidereal events could be tracked, usually the summer and winter solstices. Such structures were incapable of triggering on a diurnal solar event. Further, such structures were incapable of providing a mechanical trigger to such diurnal solar events.

Not only are there numerous ancient solar clocks, but there is also a family of "sun dials" of varying accuracy. These devices provide an approximate estimate of the sidereal time, but are incapable of providing a mechanical trigger based upon daily or diurnal solar event such as sidereal noon. Such devices are further incapable of mechanically triggering on the visibility of such diuranl solar events.

Solar energy has been known, since the time of Archimedes, to be able to trigger mechanical events. Plutarch records that during the battle of Syracuse, a group of soldiers under Archimedes' direction focused the reflection of the sun off the insides of their polished bronze shields to cause fires on the ships of a Roman fleet attacking Syracuse.

Beyond the historical importance of this first recorded example of solar power engineering, there are common characteristics to be considered. The shields needed the men to aim them at the ship to be burned. Without an aiming or tracking mechanism there would have been no mechanical event, no matter how much solar energy was available. This is a consistent theme throughout the history of solar power usage, leading to the solar tracking mechanisms in use today.

There are reports of a "Turkish canon", which consisted of a canon whose ignition cord was aligned with a magnifying lens so that it lit shortly before sidereal noon. The ignition cord burned and ignited the charge shortly thereafter, at noon. This system could detect a diurnal solar event, sidereal noon, but it was incapable of being used repeatedly at such a task.

More recently, solar tracking mechanisms have been deployed to align solar engines and photocell arrays with the motion of the brightest point or region in the sky. These mechanisms often include two connected chambers mounted on either of two opposing sides of the engine or array. The entire assembly is on a pivot. The chambers have a heat absorbent coating and are filled with a low boiling point fluid. The chambers are placed on opposite sides of the engine or array with blinders so whichever one is further away from the solar hot spot is in the shade. The chamber in the sunlight absorbs heat causing the fluid to boil and condense in the shaded chamber, making it heavier, which causes the assembly to tilt in that direction through the pivot.

This tracking mechanism is very good at following the hotspot of the sky throughout a day, but it does not have the ability to determine a specific solar event reliably. It cannot determine the time of day, or whether the sun is essentially visible at that time of day.

Other tracking and switching mechanisms include a variety of photo-cells often combined with computer systems circuits. Such systems have been used to turn on lights as evening approaches and charge batteries from solar cells when the day becomes bright enough. Again, such systems cannot determine the time of day, or whether the sun is essentially visible at that time of day.

Other similar applications include a solar cell powering a motor controlling blinds. When the sun comes up, or the sky is bright enough, the motor acts to control the blinds. When the sky becomes dark enough, the motor acts to control the blinds in a second manner. Again, such systems cannot determine the time of day, or whether the sun is essentially visible at that time of day.

What is needed is a mechanism which, without intervention or supervision, can determine whether the sun is visible during a specific diurnal solar event and mechanically trigger actions based upon the sun being visible during that diurnal solar event.

SUMMARY OF THE INVENTION

This invention provides mechanisms determining whether the sun is visible at a diurnal solar event and mechanically triggering actions based upon the sun being visible during the diurnal solar event. The mechanisms of the invention can perform these operations without intervention or supervision for long periods of time. Certain embodiments have been applied to provide a diurnal solar event trigger based upon sidereal noon for a clock whose purpose is to provide accurate timing for 10,000 years without intervention or supervision.

Certain embodiments of the invention include a mechanism activating a synchronization lever whenever a diurnal solar event is visible. The mechanism comprises a solar portal coupled to the synchronization lever, activating the synchronization lever whenever the diurnal solar event is visible at the solar portal. Such embodiments advantageously support a solar portal activating the synchronization lever whenever the diurnal solar event is visible.

The solar portal may further comprise a slot positioned so sunlight strikes a target whenever the diurnal solar event is visible at the solar portal. The target couples to the synchronization lever, activating the synchronization lever whenever the diurnal solar event is visible at the solar portal. Such embodiments advantageously support a slot positioned so sunlight strikes a target whenever the diurnal solar event is visible and the target activates the synchronization lever.

The mechanism may further comprise a solar concentrator concentrating sunlight striking the target whenever the diurnal solar event is visible at the solar portal. Such embodiments advantageously support the mechanism further comprising a solar concentrator which concentrates sunlight on the target whenever the diurnal solar event is visible at the solar portal.

The solar concentrator may be comprised of a lens aligned with the slot concentrating sunlight striking the target whenever the diurnal solar event is visible at the solar portal. Such embodiments advantageously support the solar concentrator including a lens.

The solar concentrator may also be comprised of a mirror aligned with the slot concentrating sunlight striking the target whenever the solar event is visible at the solar portal.

Such embodiments advantageously support the solar concentrator including a mirror.

The target may be further comprised of the following. A strip formed of a first material coupled to the synchronization lever and largely positioned within the target. The strip is comprised of a first end and a second end. And a support formed of a second material anchoring the first end and anchoring the second end and positioned outside the target so that sunlight does not strike the support during the diurnal solar event. The target activating the synchronization lever is further comprised of the strip activating the synchronization lever by expanding whenever the diurnal synchronization event is visible at the solar portal. Such embodiments advantageously support a strip anchored at two ends by a support activating the synchronization lever by expanding whenever the diurnal synchronization event is visible at the solar portal.

The first material has a significant and nearly uniform first coefficient of expansion across an operational temperature range. And the second material has essentially the same nearly uniform coefficient of expansion as the first coefficient of expansion across the operational temperature range. Such embodiments advantageously provide for the support expanding at essentially the same thermal rate of expansion as the strip, providing a cancellation of ambient temperature effects.

The strip may be comprised of a dark coating over at least most of the strip receiving the sunlight during the diurnal solar event. Such embodiments advantageously support a dark coating over most of the strip receiving sunlight during the diurnal solar event.

The diurnal solar event may comprise a sidereal time interval close to sidereal noon. The sidereal time interval may be within three hours of sidereal noon.

The sidereal time interval may have duration of greater than a second. The sidereal time interval may have duration of greater than a minute. The sidereal time interval may have duration of greater than an hour. Such embodiments advantageously support diurnal solar events with various interval lengths.

DETAILED DESCRIPTION OF THE INVENTION

Figure 1B:
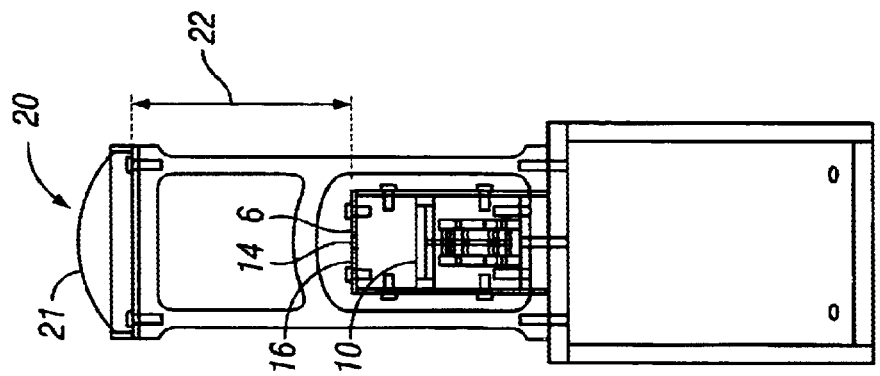
FIG. 1B depicts an end view of a mechanism including a solar portal with a lens 21 and a slot 14 positioned to concentrate sunlight on strip 10 whenever a diurnal solar event is visible at solar portal 20, in accordance with certain embodiments.
Figure 1A:
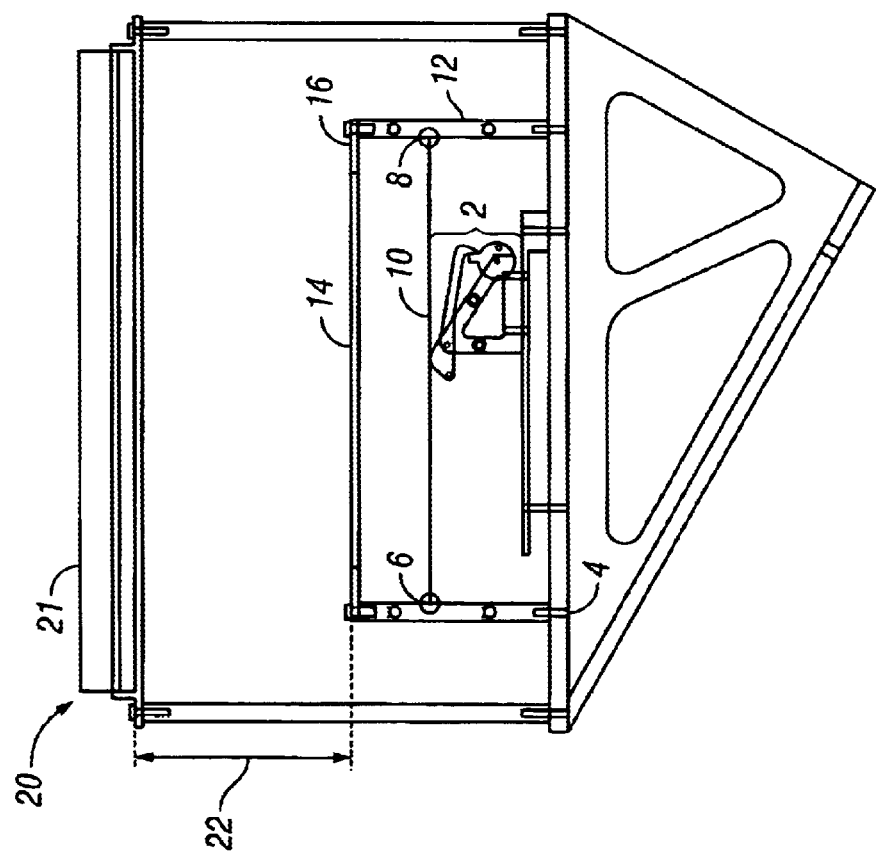
FIG. 1A depicts a side view of a mechanism activating a synchronization lever 2 comprised of a solar portal with a lens 21 and with a slot 14 positioned to concentrate sunlight in strip 10 whenever a diurnal solar event is visible at solar portal 20, in accordance with certain embodiments.

FIG. 1A depicts side view of a mechanism activating a synchronization lever 2 comprised of a solar portal with a lens 21 and with a slot 14 positioned to concentrate sunlight on strip 10 whenever a diurnal solar event is visible at solar portal 20, in accordance with certain embodiments. The strip has two ends, 6 and 8, which are aligned upon installation to allow concentrated sunlight to strike strip 10 only during the diurnal solar event.

FIG. 1B depicts an end view of a mechanism including a solar portal with a lens 21 and with a slot 14 positioned to concentrate sunlight on strip 10 whenever a diurnal solar event is visible at solar portal 20, in accordance with certain embodiments.

The sunlight shines through the solar portal striking the slot, which only allows sunlight to strike a target containing most of the strip 10, but does not allow sunlight to strike the structure 12. The strip 10 and structure 12 may be made out of materials with similar, significant coefficient of expansion. As such, the structure 12 will expand based upon the ambient temperature, whereas the strip 10 will expand based upon the visibility of the diurnal solar event. Whenever the day is cloudy so that the diurnal solar event is not visible, strip 10 will not activate synchronization lever 2. Whenever the diurnal solar event is visible, strip 10 will activate synchronization lever 2.

The solar portal may contain lens 21, which is a half-cylinder whose long axis runs the length of the solar portal. The solar portal, lens 21, slot 14 and strip 10 are then aligned upon installation to allow concentrated sunlight to strike strip 10 only during the diurnal solar event.

The structure 12 and strip 10 may be made out of primarily the same material with a significant coefficient of expansion. The structure 12 and strip 10 may further be made out of aluminum. The strip 10 may be covered with a dark coating wherever the sunlight strikes during the diurnal solar event.

The sunlight shines through the solar portal, is concentrated by lens 21 striking the slot, which only allows the concentrated sunlight to strike most of the strip 10, but does not allow sunlight to strike the structure 12. The strip 10 and structure 12 may be made out of materials with similar, significant coefficient of expansion. As such, the structure 12 will expand based upon the ambient temperature, whereas the strip 10 will expand based upon the visibility of the diurnal solar event. Whenever the day is cloudy so that the diurnal solar event is not visible, strip 10 will not activate synchronization lever 2. Whenever the diurnal solar event is visible, strip 10 will activate synchronization lever 2.

A thermal barrier may separate the structure 12 from strip 10. The thermal barrier may be made with a material of low thermal conductivity, such as glass. Because the structure 12 and strip 10 are made of materials with at least similar thermal expansion coefficients, both will uniformly expand and contract based upon the ambient temperature. The material may be primarily composed of a first metal and may be aluminum.

The operational temperature range may include −100° C. to 100° C., which is well beyond the survivable range for unsheltered humans.

The operational temperature range may further include −40° C. to 90° C., which is comparable to the operational temperature range of commercial electronics and barely survivable for unsheltered humans for short periods of time.

The mechanism may be comprised of a first component possessing a first thermodynamic state and a second component possessing a second thermodynamic state. The second component contains most of the target. The coupling of the target to the synchronization lever may be further comprised of the second component coupled to the synchronization lever and the first component differentially coupled to the synchronization lever. The target activating the synchronization lever is further comprised of the first component and the second component collectively activating the synchronization lever whenever the second thermodynamic state differs from the first thermodynamic state by an amount only occurring when the diurnal solar event is visible. Such embodiments advantageously support activating the synchronization lever whenever the first and second thermodynamic states differ by an amount only occurring when the diurnal solar event is visible.

The first component may be comprised a first container containing a first fluid and the second component comprising a second container containing essentially the first fluid. The first component differentially couples to the synchronization lever by expansion of the first fluid of the first container. The second component couples to the synchronization lever by expansion of the first fluid of the second container. Such embodiments advantageously support the second component receiving sunlight whenever the diurnal solar event is visible at the target and the first component differentially counteracting the second to compensate for the ambient temperature.

The first container may further comprise a first containing shell formed of a thermally conducting shell material and the second container further comprising a second containing shell formed of the thermally conducting shell material. The second containing shell largely overlaps the target. Such embodiments advantageously support the two containers further comprising containing shells formed of thermally conductive shell material and the second containing shell largely overlapping the target struck by sunlight when the diurnal solar event is visible.

The first fluid may be primarily composed of mercury, which has very good thermal expansion characteristics.

The shell material primarily may be composed of copper, which has very good thermal conductivity and good thermal expansion characteristics.

Figure 2:
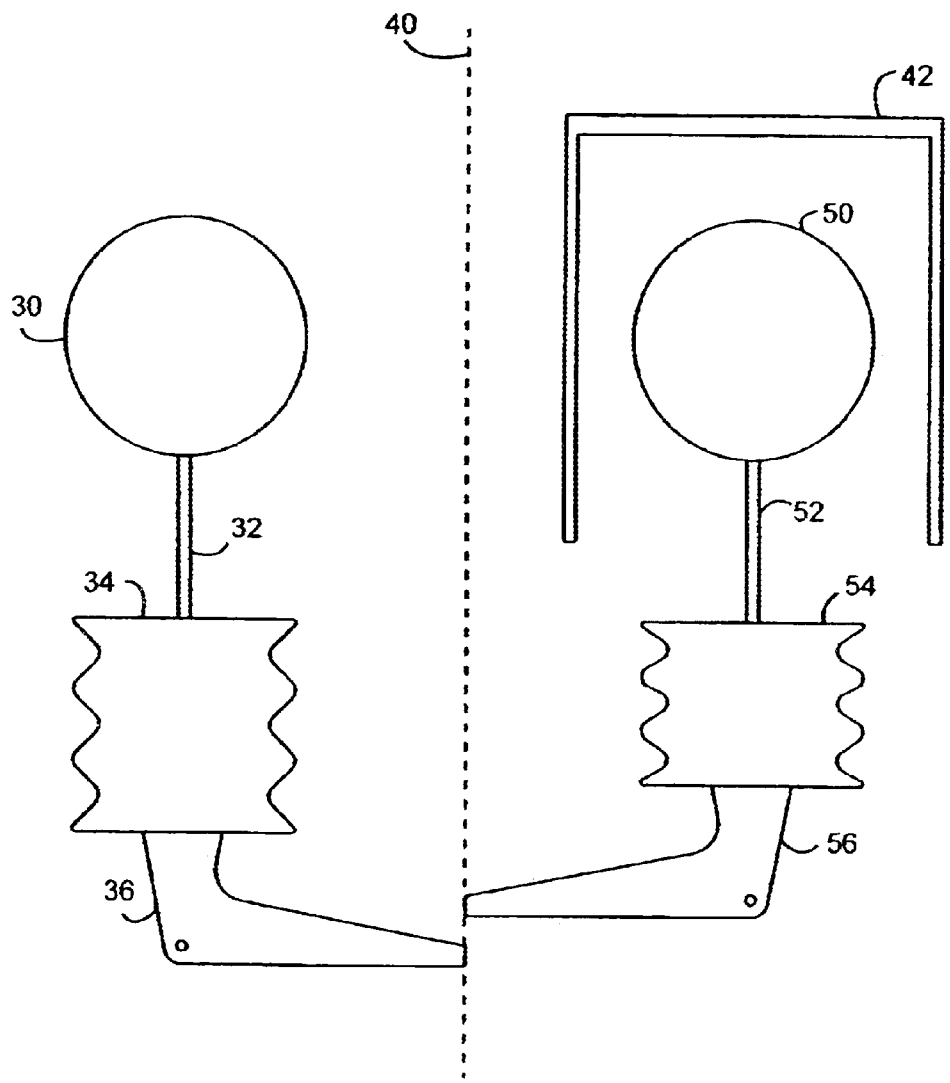
FIG. 2 depicts a mechanism containing a chamber 30 coupled 32-34-36 to synchronization lever 40 and chamber 50 shrouded 42 and differentially coupled 52-54-56 to synchronization lever 40, in accordance with certain embodiments.

FIG. 2 depicts a second component comprised of container 30 coupled 32-34-36 to synchronization lever 40 and a first component comprised of container 50 differentially couple 52-54-56 to synchronization lever 40, with container 50 shrouded 42 during normal operation, in accordance with certain embodiments.

The first component possesses a first thermodynamic state and the second component possesses a second thermodynamic state. The synchronization lever collectively activates the couplings of the first and second components. The synchronization lever is further activated whenever the second thermodynamic state differs from the first thermodynamic state by an amount only occurring when the daily solar event is visible.

The first component may include a first container 50 containing a first fluid and the second component may include a second container 30, containing a second fluid. The first component differentially couples to the synchronization lever by expansion of the first fluid of the first container 50. The second component couples to the synchronization lever by expansion of the first fluid of the second container 30.

The first container 50 may further include a first containing shell formed of a thermally conducting shell material. The second container 30 may further include a second containing shell formed of the thermally conducting shell material. The second containing shell 30 may largely overlap the target. The first fluid may be primarily composed of mercury. The shell material may be primarily composed of copper.

The target, second container 30 may further be painted black. The fluid expands into bellows 34 from container 30 through tube 32. The first container 50 may be shrouded. The fluid expands into bellows 54 from container 50 through tube 52.

The mechanism may include a motor containing a third material. The third material has a first thermodynamic phase to a second thermodynamic phase threshold occurring only when the diurnal solar event is visible. The mechanism activates the synchronization lever and is further comprised of the motor activating the synchronization lever whenever the third material transitions from the first phase to the second phase.

The mechanism may comprise motors containing a material whose phase transition threshold only occurs when the diurnal solar event is visible at the solar portal.

The first phase may be solid and the second phrase, liquid. Such embodiment advantageously support solid to liquid phase transition thresholds for the motor.

The third material may be a wax possessing a solid-to-liquid phase transition occurring only when the diurnal solar event is visible at the solar portal.

The first phase may be liquid and the second phase, gas. Such embodiments advantageously support motors containing a third material with a liquid to gas phase transition, which only occurs when the, diurnal solar event is visible at the solar portal.

Figure 3A:
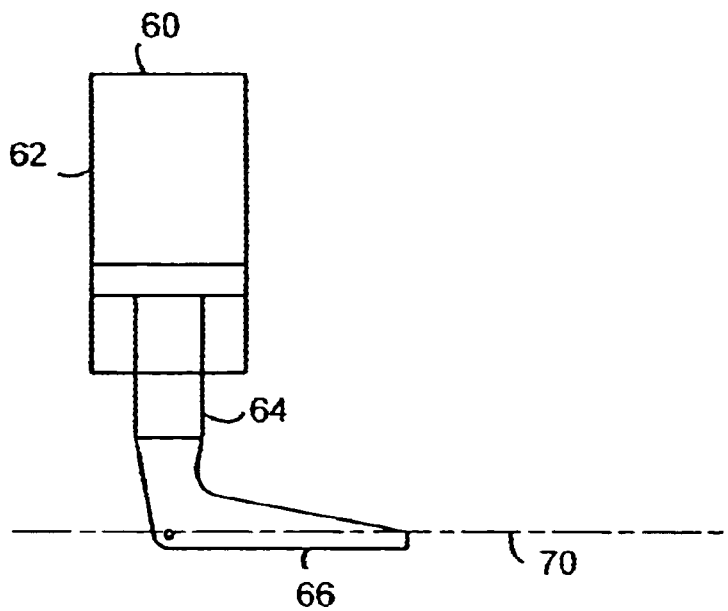
FIG. 3A depicts a mechanism containing a wax motor 62 with target 60 coupled to synchronization lever 70 and activating synchronization lever 70 in accordance with certain embodiments.

FIG. 3A depicts a wax motor 62 with target 60 coupled via a coupler 64–66 to synchronization lever 70 and activating synchronization lever 70 in accordance with certain embodiments.

Figure 3B:
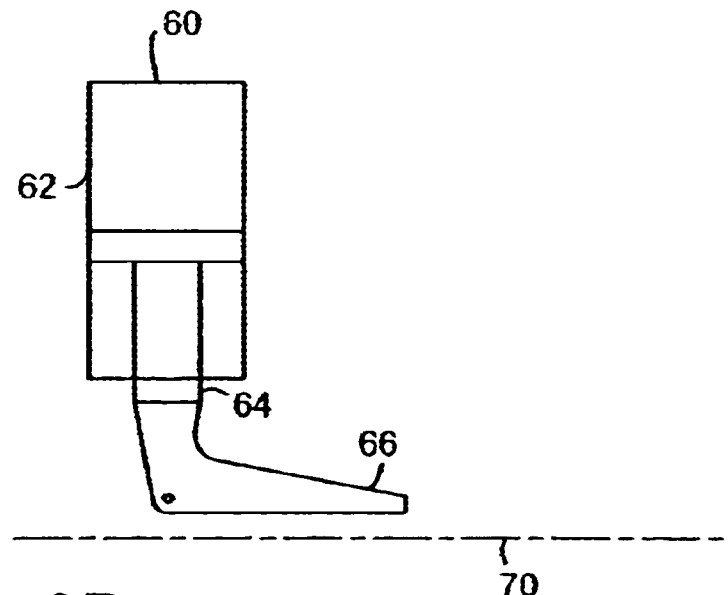
FIG. 3B depicts a mechanism containing a wax motor 62 with target 60 coupled 64-66 to synchronization lever 70 and not activating synchronization lever 70 in accordance with certain embodiments.

FIG. 3B depicts a wax motor 62 with target 60 coupled via a coupler 64–66 to synchronization lever 70 and not activating synchronization lever 70 in accordance with certain embodiments.

The mechanism may include a motor 62 containing a third material. The third material may have a first thermodynamic phase to a second phase threshold occurring only when the daily solar event is visible. The solar portal activates the synchronization lever as motor 62 activates the synchronization lever whenever the third material transitions from the first thermodynamic phase to the second phase. The wax may be selected to make the solid-to-liquid phase transition at about 150° F. or 66° C. The motor 62 may activate the synchronization lever by pushing past a threshold 70.

The first component may be differentially coupled to the synchronization lever providing a first torque based upon the first thermodynamic state and the second component coupled to the synchronization lever providing a second torque based upon the second thermodynamic state. Activating the synchronization lever further comprises activating the synchronization lever whenever the second torque differs from the first torque by an amount only occurring whenever the diurnal solar event is visible.

Such embodiments advantageously support activating the synchronization lever based upon a difference in torque from the first and second component couplings by an amount occurring only whenever the diurnal solar event is visible.

The first component may further comprise a first thermal spring differentially coupled to the synchronization lever providing the first torque based upon ambient temperature as the first thermodynamic state. The second component may comprise a second thermal spring coupled to the synchronization lever providing the second torque based upon target temperature as the second thermodynamic state. The first thermal spring provides the first torque based upon the ambient temperature. The second thermal spring provides the second torque based upon the target temperature.

The first thermal spring and the second thermal spring may be formed of a bimetal. The bimetal may be comprised of a first layer primarily containing a fourth material with a significant thermal coefficient of expansion laminated to a second layer primarily containing a fifth material with a low thermal coefficient of expansion.

The fifth material may be Inver, which has a low thermal coefficient of expansion, is commonly available and inexpensive. The fourth material may be brass, which has a significant thermal coefficient of expansion, is commonly available and inexpensive.

Figure 4A:
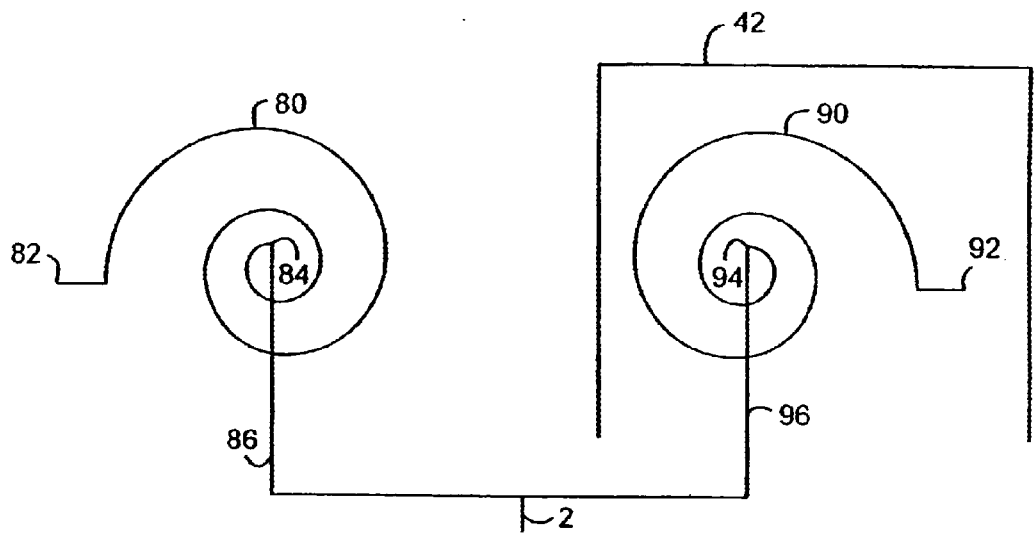
FIG. 4A depicts a mechanism including a first component containing spring 90 differentially coupled 94-96, and a second component containing spring 80 coupled 84-86, to synchronization lever 2 whenever the diurnal solar event is visible, in accordance with certain embodiments.

FIG. 4A depicts a first component containing spring 90 differentially coupled via a coupler 94–96 and a second component containing spring 80 coupled via a coupler 84–86 to synchronization lever 2 whenever the diurnal solar event is visible, in accordance with certain embodiments.

The first component may include a first thermal spring 90 differentially coupled via a coupler 94–96 to the synchronization level 2, providing the first torque based upon ambient temperature as the first thermodynamic state. The second component may include a second thermal spring 80 coupled via a coupler 84–86 to the synchronization lever 2, providing the second torque based upon target temperature as the second thermodynamic state.

The first thermal spring 90 and the second thermal spring 80 may be formed of bimetal.

The first component may be differentially coupled to the synchronization lever providing a first electrical potential and the second component coupled to the synchronization lever providing a second electrical potential. Activating the synchronization lever is further comprised of activating the synchronization lever whenever the second electrical potential differs from the first electrical potential by an amount only occurring whenever the diurnal solar event is visible.

Such embodiments advantageously support use of electrical potential difference generated by the thermal distinction between the components, one of which is struck by sunlight whenever the diurnal solar event is visible.

Figure 4B:
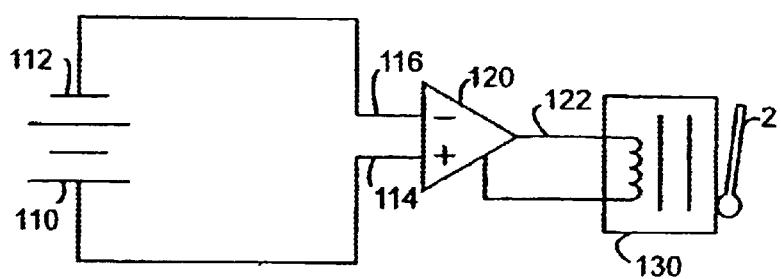
FIG. 4B depicts a mechanism including a thermophile comprised of second and first components generating electric potentials 110 and 112 coupled directly 114 and differentially 116 via differential amplifier 120 through 122 to solenoid 130, which activates synchronization switch 2 whenever the diurnal solar event is visible, in accordance with certain embodiments.

FIG. 4B depicts a thermopile comprised of second and first components generating electric potentials 110 and 112 coupled directly 114 and differentially 116 via differential amplifier 120 through 122 to solenoid 130, which activates synchronization switch 2 whenever the diurnal solar event is visible, in accordance with certain embodiments.

The thermopile first component generating electric potential 112 may be further coupled to a block of thermally conductive metal forming an ambient temperature reservoir. The thermally conductive metal forming the ambient temperature, reservoir may be primarily composed of copper.

Activating the synchronization lever further includes activating the synchronization lever whenever the second electrical potential differs from the first electrical potential by an amount only occurring whenever the daily solar to event is visible.

Certain embodiments of the invention include a method of activating a lever based upon a diurnal solar event visible at a portal having a thermodynamic state comprised of the following. Providing the lever activation based upon the portal thermodynamic state. And activating the lever only when the diurnal solar event is visible at the portal.

Such embodiments advantageously support providing the lever activation based upon the portal thermodynamic state and activating the level only when the diurnal solar event is visible at the portal.

Providing the lever activation may further be comprised of providing the lever activation based upon a portal thermodynamic, state minus the ambient thermodynamic state. Such embodiments advantageously support compensation of the ambient thermodynamic state in the lever activation.

The portal thermodynamic state may be a concentration of the thermodynamic state of a region associated with the diurnal solar event. Such embodiments advantageously support concentration of the portal thermodynamic state of a region associated with the diurnal solar event. The region associated with the diurnal solar event may include a portion of the sky in which diurnal solar events are visible throughout the year, which will vary through the seasons of each year.

The diurnal solar event triggering mechanism is used as follow. When the diurnal solar event is visible, the synchronization lever activates. Activation of the synchronization lever releases a force on a drive train to correct the position of the clock in which it is employed.

The positional correction may be either forward or backward of the current clock position. This is due in part to the fact that sidereal noon is not the same as clock noon, varying through the seasons and further, through the years. The clock positional correction is achieved by use of a cam which over short periods of time is heart shaped, and other long periods of time is a heart shaped cylinder known as the equation of time (EOT) cam.

There are several methods of coupling the EOT cam to the clock system. The first method adjusts the clock system reset, which may be slightly before or after the clock event. The second method is to change the use of the EOT cam to slightly change the angle of the solar portal, slot, concentrator, etc., so that it always activates at the clock event, rather the diurnal solar event. The third method is to use the EOT cam to adjust the clock to solar time, to rotate the clock readout so that it reads the corrected time.

The preceding embodiments have been provided by way of example and are not meant to constrain the scope of the following claims.

What is claimed is:

1. A mechanism activating a synchronization lever whenever a diurnal solar event is visible, comprising:

a solar portal;

a slot positioned so sunlight strikes a target whenever said diurnal solar event is visible at said solar portal;

wherein said target couples to said synchronization lever activating said synchronization lever whenever said diurnal solar event is visible at said solar portal; and wherein said synchronization lever is activated only when said diurnal solar event is visible at said portal.

2. The mechanism of claim 1;

further comprising a solar concentrator concentrating sunlight striking said target whenever said diurnal solar event is visible at said solar portal.

3. The mechanism of claim 2, wherein said solar concentrator is comprised of a lens aligned with said slot concentrating sunlight striking said target whenever said diurnal solar event is visible at said solar portal.

4. The mechanism of claim 2, wherein said solar concentrator is comprised of a mirror aligned with said slot concentrating sunlight striking said target whenever said solar event is visible at said solar portal.

5. The mechanism of claim 1, wherein said target is further comprised of
a strip formed of a first material coupled to said synchronization lever, wherein said strip is comprised of a first end and a second end and largely positioned within said target; and
a support formed of a second material anchoring said first end and anchoring said second end and positioned outside said target so that sunlight does not strike the support during said diurnal solar event; and wherein said target activating said synchronization lever is further comprised of said strip activating said synchronization lever by expanding whenever said diurnal synchronization event is visible at said solar portal.

6. The mechanism of claim 5, wherein said first material has a significant and nearly uniform first coefficient of expansion across an operational temperature range; and wherein said second material has essentially the same nearly uniform coefficient of expansion as said first coefficient of expansion across said operational temperature range.

7. The mechanism of claim 6, wherein said operational temperature range includes −100° C. to 100° C.

8. The mechanism of claim 6, wherein said operational temperature range includes −40° C. to 90° C.

9. The mechanism of claim 5, wherein said first material is primarily composed of a first metal; and wherein said second material is primarily composed of said first metal.

10. The mechanism of claim 9, wherein said first metal is aluminum.

11. The mechanism of claim 5, wherein said strip is further comprised of a dark coating over at least most of said strip receiving said sunlight during said diurnal solar event.

12. The mechanism of claim 1, further comprising:
a first component possessing a first thermodynamic state; and
a second component possessing a second thermodynamic state and containing most of said target;

wherein said target couples to said synchronization lever is further comprised of:
said second component coupled to said synchronization lever; and
said first component differentially coupled to said synchronization lever;

wherein said target activating said synchronization lever is further comprised of said first component and said second component collectively activating said synchronization lever whenever said second thermodynamic state differs from said first thermodynamic state by an amount only occurring when said diurnal solar event is visible.

13. The mechanism of claim 12, wherein said first component is comprised of a first container containing a first fluid;

wherein said second component is comprised of a second container containing essentially said first fluid;

wherein said first component differentially couples to said synchronization lever by expansion of said first fluid of said first container;

wherein said second component couples to said synchronization lever by expansion of said first fluid of said second container.

14. The mechanism of claim 13, wherein said first container further comprises a first containing shell formed of a thermally conducting shell material;

wherein said second container further comprises a second containing shell formed of said thermally conducting shell material; and wherein said second containing shell largely overlaps said target.

15. The mechanism of claim 14, wherein said first fluid is primarily composed of mercury.

16. The mechanism of claim 14, wherein said shell material is primarily composed of copper.

17. The mechanism of claim 12, wherein said first component is differentially coupled to said synchronization lever providing a first torque based upon said first thermodynamic state;

wherein said second component is coupled to said synchronization lever providing a second torque based upon said second thermodynamic state; and wherein activating said synchronization lever is further comprised of activating said synchronization lever whenever said second torque differs from said first torque by an amount only occurring whenever said diurnal solar event is visible.

18. The mechanism of claim 17, wherein said first component is comprised of a first thermal spring differentially coupled to said synchronization lever providing said first torque based upon ambient temperature as said first thermodynamic state; and wherein said second component is comprised of a second thermal spring coupled to said synchronization lever providing said second torque based upon target temperature as said second thermodynamic state.

19. The mechanism of claim 18, wherein said first thermal spring is formed of a bimetal; and wherein said second thermal spring is formed of said bimetal.

20. The mechanism of claim 19,
wherein said bimetal comprises a first layer primarily containing a fourth material with a significant thermal coefficient of expansion laminated to a second layer primarily containing a fifth material with a low thermal coefficient of expansion.

21. The mechanism of claim 20,
wherein said fifth material is Inver.

22. The mechanism of claim 20,
wherein said fourth material is brass.

23. The mechanism of claim 12, wherein said first component differentially coupled to said synchronization lever provides a first electrical potential, said first component further coupled to an ambient temperature reservoir;
wherein said second component coupled to said synchronization lever provides a second electrical potential; and
wherein activating said synchronization lever is further comprised of activating said synchronization lever whenever said second electrical potential differs from said first electrical potential by an amount only occurring whenever said diurnal solar event is visible.

24. The mechanism of claim 1, further comprising a motor containing a third material with a first phase to a second phase threshold occurring only when said diurnal solar event is visible; and
wherein said target activating said synchronization lever is further comprised of said motor whenever said third material transitions from said first phase to said second phase.

25. The mechanism of claim 24, wherein said first phase is solid.

26. The mechanism of claim 25, wherein said third material is wax.

27. The mechanism of claim 24, wherein said first phase is liquid; and
wherein said second phase is gas.

28. A method of activating a synchronization lever based upon a diurnal solar event comprising the steps of:
providing a solar portal;
positioning a slot so sunlight strikes a target whenever said diurnal solar event is visible at said solar portal, wherein said target couples to said synchronization lever activating said synchronization lever based upon a thermodynamic state of said portal whenever said diurnal solar event is visible at said solar portal; and
activating said lever only when said diurnal solar event is visible at said portal.

29. The method of claim 28, wherein activating said synchronization level comprises activating said lever based upon said portal thermodynamic state minus an ambient thermodynamic state.

30. The method of claim 28,
wherein said portal thermodynamic state is a concentration of the thermodynamic state of a region associated with said diurnal solar event.

* * * * *